(12) United States Patent
Bhandaru et al.

(10) Patent No.: US 10,191,532 B2
(45) Date of Patent: *Jan. 29, 2019

(54) CONFIGURING POWER MANAGEMENT FUNCTIONALITY IN A PROCESSOR

(71) Applicant: Intel Corporation, Santa Clara, CA (US)

(72) Inventors: Malini K. Bhandaru, San Jose, CA (US); Eric J. Dehaemer, Shrewsbury, MA (US); Scott P. Bobholz, Bolton, MA (US); Raghunandan Makaram, Northborough, MA (US); Vivek Garg, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 15/048,055

(22) Filed: Feb. 19, 2016

(65) Prior Publication Data

US 2016/0170478 A1    Jun. 16, 2016

Related U.S. Application Data

(63) Continuation of application No. 14/960,693, filed on Dec. 7, 2015, now Pat. No. 9,760,155, which is a (Continued)

(51) Int. Cl.
*G06F 1/32* (2006.01)
*G06F 1/26* (2006.01)

(52) U.S. Cl.
CPC ............... *G06F 1/324* (2013.01); *G06F 1/26* (2013.01); *G06F 1/3206* (2013.01);
(Continued)

(58) Field of Classification Search
CPC .................................................... G06F 1/3203
(Continued)

(56) References Cited

U.S. PATENT DOCUMENTS 5,163,153 A    11/1992  Cole et al.
5,522,087 A    5/1996   Hsiang
(Continued)

FOREIGN PATENT DOCUMENTS

CN    1584773     2/2005
CN    102306048   1/2012
(Continued)

OTHER PUBLICATIONS

Great Britain Intellectual Property Office, Examination Report dated Oct. 24, 2016 in Great Britain Patent Application No. 1500049.0.

(Continued)

*Primary Examiner* — Suresh Suryawanshi
(74) *Attorney, Agent, or Firm* — Trop, Pruner & Hu, P.C.

(57) ABSTRACT

In one embodiment, a multicore processor includes cores that can independently execute instructions, each at an independent voltage and frequency. The processor may include a power controller having logic to provide for configurability of power management features of the processor. One such feature enables at least one core to operate at an independent performance state based on a state of a single power domain indicator present in a control register. Other embodiments are described and claimed.

18 Claims, 8 Drawing Sheets

Related U.S. Application Data continuation of application No. 13/785,259, filed on Mar. 5, 2013, now Pat. No. 9,235,244, which is a continuation of application No. 13/600,568, filed on Aug. 31, 2012, now Pat. No. 8,984,313.

(52) U.S. Cl.
CPC .......... *G06F 1/3225* (2013.01); *G06F 1/3234* (2013.01); *G06F 1/3243* (2013.01); *G06F 1/3275* (2013.01); *G06F 1/3296* (2013.01); *Y02D 10/126* (2018.01); *Y02D 10/172* (2018.01)

(58) Field of Classification Search
USPC ....................................................... 713/320
See application file for complete search history.

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,665,802 B1 | 12/2003 | Ober |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,178,044 B2 | 2/2007 | Pappalardo et al. |
| 7,194,643 B2 | 3/2007 | Gonzalez et al. |
| 7,272,730 B1 | 9/2007 | Acquaviva et al. |
| 7,412,611 B2 | 8/2008 | Tipley |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,555,422 B2 | 6/2009 | Newman et al. |
| 7,730,340 B2 | 6/2010 | Hu et al. |
| 7,739,528 B2 | 6/2010 | Zhuang et al. |
| 7,917,778 B2* | 3/2011 | Tatsumi ................ G06F 1/3203 713/300 |
| 8,429,441 B2 | 4/2013 | Baker et al. |
| 8,438,359 B2 | 5/2013 | Kasahara et al. |
| 8,463,973 B2 | 6/2013 | Naffziger et al. |
| 8,560,869 B2 | 10/2013 | Allarey |
| 8,726,047 B2* | 5/2014 | Lee ............................ G06F 1/26 713/300 |
| 8,943,334 B2 | 1/2015 | Kumar et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0025069 A1 | 2/2004 | Gary et al. |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2005/0194948 A1* | 9/2005 | Carlson ..................... G06F 1/26 323/272 |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0157036 A1 | 7/2007 | Jahagirdar et al. |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0057894 A1* | 3/2008 | Aleksic ................. H02J 9/002 455/187.1 |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0199020 A1* | 8/2009 | Bose ..................... G06F 1/3203 713/300 |
| 2009/0235105 A1 | 9/2009 | Branover et al. |
| 2010/0115309 A1 | 5/2010 | Carvalho et al. |
| 2010/0138675 A1 | 6/2010 | Nikazm et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2011/0161683 A1 | 6/2011 | Zou et al. |
| 2011/0276812 A1* | 11/2011 | Lee .......................... G06F 1/26 713/300 |
| 2012/0054515 A1 | 3/2012 | Naffziger et al. |
| 2012/0072750 A1 | 3/2012 | Jahagirdar et al. |
| 2012/0079290 A1 | 3/2012 | Kumar |
| 2012/0216029 A1 | 8/2012 | Shah et al. |
| 2012/0216058 A1 | 8/2012 | Wells et al. |
| 2012/0226926 A1 | 9/2012 | Gunther et al. |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0068290 A1 | 3/2014 | Bhandaru et al. |
| 2014/0195829 A1 | 7/2014 | Bhandaru et al. |
| 2014/0208141 A1 | 7/2014 | Bhandaru et al. |

FOREIGN PATENT DOCUMENTS

| | | | |
|---|---|---|---|
| EP | 1 282 030 A1 | | 5/2003 |
| WO | 2012040052 | | 3/2012 |

OTHER PUBLICATIONS

Great Britain Intellectual Property Office, Examination Report dated Oct. 21, 2016 in Great Britain Patent Application No. 1603811.9.

Great Britain Intellectual Property Office, Examination Report dated Oct. 21, 2016 in Great Britain Patent Application No. 1603816.8.

Great Britain Intellectual Property Office, Examination Report dated Oct. 21, 2016 in Great Britain Patent Application No. 1603821.8.

United States Patent and Trademark Office, Non-Final Office Action dated Jan. 10, 2017 in U.S. Appl. No. 14/960,693.

U.S. Patent and Trademark Office, Office Action dated Aug. 5, 2014 in U.S. Appl. No. 13/600,568, with Reply to Office Action filed on Oct. 29, 2014.

International Searching Authority, "Notification of Transmittal of the International Search Report and the Written Opinion of the International Searching Authority," dated Oct. 18, 2013, in International application No. PCT/JUS2013/048042.

Intel Developer Forum, IDF2010, Opher Kahn, et al., "Intel Next Generation Microarchitecture Codename Sandy Bridge: New Processor Innovations," Sep. 13, 2010, 58 pages.

(56) References Cited

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

State Intellectual Property Office of the People's Republic of China, First Office Action dated Jul. 1, 2016 in Chinese Patent Application No. 201380040201.8.

United States Patent and Trademark Office, Non-Final Office Action dated Dec. 28, 2017 in U.S. Appl. No. 15/048,189.

United States Patent and Trademark Office, Reply to Non-Final Office Action filed Apr. 13, 2018 in U.S. Appl. No. 15/048,189.

State Intellectual Property Office of the People's Republic of China, First Office Action dated Mar. 28, 2018 in Chinese Patent Application No. 201610176774.9.

State Intellectual Property Office of the People's Republic of China, First Office Action dated Mar. 28, 2018 in Chinese Patent Application No. 201610176585.1.

State Intellectual Property Office of The People's Republic of China, First Office Action dated Mar. 28, 2018 in Chinese Patent Application No. 201610176751.8.

United States Patent and Trademark Office, Final Office Action dated Jun. 20, 2018 and Reply filed Aug. 20, 2018 in U.S. Appl. No. 15/048,189.

\* cited by examiner

CONFIGURING POWER MANAGEMENT FUNCTIONALITY IN A PROCESSOR

This application is a continuation of U.S. patent application Ser. No. 14/960,693, filed Dec. 7, 2015, which is a continuation of U.S. patent application Ser. No. 13/785,259, filed Mar. 5, 2013, now U.S. Pat. No. 9,235,244, issued Jan. 12, 2016, which is a continuation of U.S. patent application Ser. No. 13/600,568, filed Aug. 31, 2012, now U.S. Pat. No. 8,984,313, issued Mar. 17, 2015, the content of which is hereby incorporated by reference.

TECHNICAL FIELD

Embodiments relate to power management of an integrated circuit.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

Power and thermal management issues are considerations in all segments of computer-based systems. While in the server domain, the cost of electricity drives the need for low power systems, in mobile systems battery life and thermal limitations make these issues relevant. Optimizing a system for maximum performance at minimum power consumption is usually done using the operating system (OS) or system software to control hardware elements. Most modern OS's use the Advanced Configuration and Power Interface (ACPI) standard (e.g., Rev. 3.0b, published Oct. 10, 2006) for optimizing the system in these areas.

An ACPI implementation allows a processor core to be in different power-saving states or C-states (also termed low power or idle states), generally referred to as C0 to Cn states, with C0 being the active state and higher ones being deeper sleep states. In addition to power-saving states, performance states or so-called P-states are also provided in ACPI. These performance states may allow control of performance-power levels while a core is in an active state (C0). In general, multiple P-states may be available, from P0-PN. There can be a range of higher frequency/performance states that are generally referred to as turbo mode.

DETAILED DESCRIPTION

Figure 1:
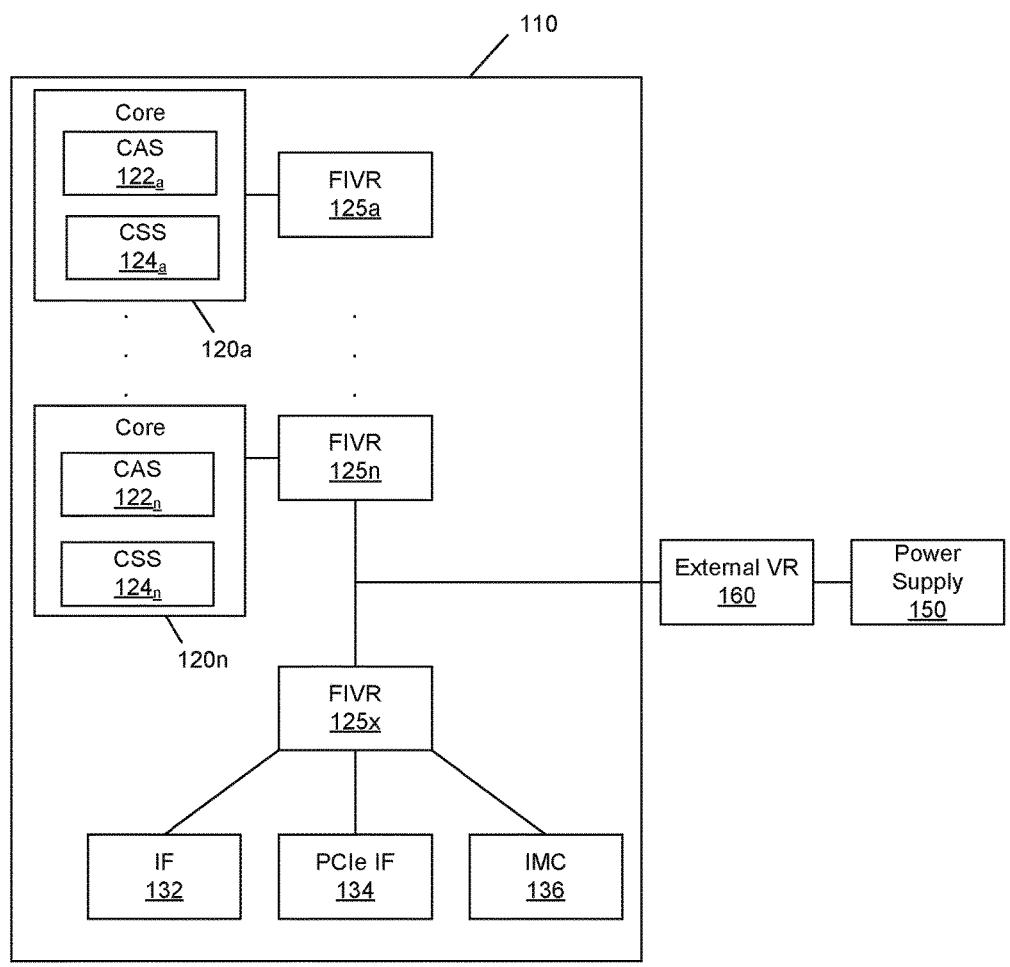
FIG. 1 is a block diagram of a portion of a system in accordance with an embodiment of the present invention.

Embodiments provide techniques to efficiently and configurably operate a processor at dynamic power/performance levels to enable the processor to be finely tuned within a system to address issues for a given type of platform in which the processor is configured. Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package. As used herein, the terms hardware thread, thread, and logical core are all used interchangeably.

According to an OS-based ACPI mechanism, a processor can operate at various power and performance states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states). When all cores of a multicore processor are in a core low power state, the processor can be placed in a package low power state, such as a package C6 low power state.

In addition to these power states, a processor can further be configured to operate at one of multiple performance states, P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and thermal budget is available, processor hardware can configure the processor or at least portions thereof to operate at a higher than guaranteed frequency. In many implementations a processor can include multiple so-called bin frequencies, also referred to herein as turbo mode frequencies, above this P1 frequency. The highest such frequency may correspond to a maximum turbo frequency (P01), which is the highest frequency at which a domain can operate. This maximum turbo frequency thus is the highest end of multiple turbo mode frequencies greater than the P1 frequency and corresponds to a maximum non-guaranteed highest performance level that can be achieved. As will be described herein, turbo can be enabled/disabled across all cores or on a hardware thread basis. Embodiments provide a configuration mechanism to operate in conjunction with turbo controls that are at a package level and individual core level (via the hardware thread). Note that the terms "performance state" or "P-state" can be interchangeably used with the term "operating frequency" (or more generally "frequency") as the frequency at which a core operates has a direct correlation to its performance. Thus as used herein a higher performance state correlates to a higher operating frequency.

A processor in accordance with an embodiment of the present invention may include a fully integrated voltage regulation (FIVR) such that per core P-states (PCPS) can be provided. In this way, cores can be operated at frequencies independently of each other.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations described below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Although a processor can have various dynamic power/performance features, embodiments may be used to provide configurability of some or all of such features. For purposes of illustration herein, three dynamic power/performance features will be described in detail: Per Core P-States (PCPS), uncore frequency scaling (UFS), and energy efficient turbo (EET).

The PCPS feature allows individual cores of a multicore processor to concurrently operate at different frequencies within the overall power, electrical, thermal and stock keeping unit (SKU) constraints. The UFS feature uses sensor values to dynamically adjust uncore interconnect frequency to better allocate power between cores and uncore interconnect to increase performance, and under idle scenarios to conserve power. The EET feature dynamically adjusts frequency in a turbo range for a core based on core stalls (e.g., when one or more threads executing on a core are waiting for either a load or store). Since a stalled core, either due to workload mix or application memory access patterns, is not frequency friendly and unable to provide improved performance from increased operating frequency, EET operation can improve power/performance tradeoffs in a processor.

In various embodiments, configurable parameters may be provided to enable a user to mix and match the above features (and/or other power/performance features). In addition, these features may be made to be configurable, allowing fine tuning of a system to meet the needs of different market segments, including but not limited to cloud computing, high performance computing, data centers, and storage, among others. In this way, a single processor can provide power and performance features that can be implemented with differentiated selection across the compute continuum, with a wide range of usage models.

In various embodiments, PCPS enables operation of individual physical cores at different voltage/frequency points concurrently based on OS requested performance on the logical cores associated with a physical core. That is, the operating point of each core can be configured independently of the other cores (within overall system power and thermal constraints). In one embodiment of the invention, PCPS is feasible due to a fully integrated voltage regulator (FIVR) that is integrated in the processor. This regulator allows independent configuration of each core, wherein the configuration includes, but is not limited to, voltage setting, frequency setting, and other parameters that affect the power consumption of each core.

In contrast to operating all cores of a multicore processor at a common voltage/frequency point that is the maximum of the OS requested performance across all logical cores, PCPS can enable power savings by running physical cores only as high as the OS determines is appropriate. Embodiments can increase performance by way of allocating excess power budget to only cores that seek it, allowing them to run faster and increase system performance.

In one embodiment of the invention, the processor has a plurality of processing cores and a power control module that is coupled with each of the plurality of processing cores. The power control module facilitates each core to operate at a performance state that is independent of the performance state of other cores, where the overall thermal and electrical constraints of the package or system are not violated. In this way, better control over power consumption and performance can be realized. For example, in a multicore processor only a few cores may be enabled to run at a higher core frequency in a thermally constrained environment, enabling execution of a desired workload while reducing power consumption and thus temperature.

In a FIVR implementation in which each core within a processor has its own voltage regulator, one or more additional voltage regulators may be provided for use with other components within a processor such as uncore logic, memory controller logic, power control unit, and so forth. Of course, in some embodiments a single voltage regulator may be associated with one or more cores and/or other components of a processor. In one embodiment, a dedicated voltage regulator may be provided for uncore circuitry of a processor, which would allow the uncore to run at a different voltage and frequency. For a compute centric workload, the uncore can be run at a lower voltage and frequency, resulting in applying power savings toward higher core frequencies at a socket level. For memory and IO intensive workloads, the uncore can be run at a higher voltage and frequency, while the cores can run at lower voltages/frequencies, compensating for higher power consumption in the uncore.

In some embodiments, ACPI tables may be extended to include information regarding these individual integrated voltage regulators to enable per core P-state control. For example, a 4-bit field may be used to pass P-state information and map it to control voltage logic for each regulator. Thus using embodiments of the present invention, each core may be controlled to operate at a different frequency and/or voltage for an asymmetric workload. As one example, one or a few of multiple cores can be controlled to operate at higher frequencies and/or voltages while the remaining cores are controlled to operate at lower voltage/frequency combinations to thus stay within a given thermal design power (TDP) envelope. In this way, deterministic and optimal performance capability selection can be realized for given workloads.

For example, cores that seek a higher performance level to process data in a first manner can operate at a higher voltage/frequency (such cores may execute tasks such as data processing usage such as data-duplication services, data analytics, parity computations or so forth), while cores executing, e.g., management tasks, can run at lower voltages/frequencies to provide for an optimal mix for a TDP-constrained environment. Thus rather than opportunistically running all cores at a higher frequency when possible (as with a so-called turbo mode) given a thermal or TDP budget, embodiments provide for deterministic behavior on an individual core basis.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120$_a$-120$_g$. In addition, each core may be associated with an individual voltage regulator 125$_a$-125$_n$. Accordingly, a FIVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, each core can include various hardware sensors and other circuitry than can provide information for use in performing dynamic control of multiple power management features of a processor in accordance with an embodiment of the present invention. More specifically as shown in FIG. 1, each core can include a core activity sensor 122 and a core stall sensor 124.

In one embodiment, core stall sensor 124 may be configured to determine a stall rate of a core which corresponds to a measure of waiting for stores/loads. This stall rate can be determined in various manners, ranging from a simple count of cycles for which the core is stalled to more complicated manners.

In one embodiment, core activity sensor 122 may be configured to determine an activity rate of a core. This activity rate can be determined in various manners, ranging from a simple count of cycles for which the core is active to more complicated manners. In one embodiment, core activity sensor 122 can be configured to count cycles in which one or more threads on a core is in an active C0 state.

Without loss of generality assume a physical core is associated with two logical processors or hardware threads, then the core has an active or C0 value that equals the time when one or more associated logical cores is active, that is, in a C0 state during the observation window.

Still referring to FIG. 1, additional components may be present within the processor including an input/output interface 132, another interface 134, and an integrated memory controller 136. As seen, each of these components may be powered by another integrated voltage regulator 125$_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007). While not shown for ease of illustration, understand that additional components may be present within processor 110 such as uncore logic, a power control unit, and other components such as internal memories, e.g., one or more levels of a cache memory hierarchy and so forth. Furthermore, while shown in the implementation of FIG. 1 with an integrated voltage regulator, embodiments are not so limited.

In various embodiments, PCPS enables operation of individual physical cores at different voltage/frequency points concurrently based on OS requested performance on the logical cores associated with a physical core. In contrast to operating all cores of a multicore processor at a common voltage/frequency point that is the maximum of the OS requested performance across all logical cores, PCPS can enable power savings by running physical cores only as high as the OS determines is appropriate. Embodiments can increase performance by way of allocating excess power budget to only cores that seek it, allowing them to run faster and increase system performance.

Accordingly, PCPS configuration allows clubbing all cores into a single power domain or having a power domain per core. The number of power domains in turn affects the implementation of certain legacy P-state behavior, namely certain ACPI parameters including a SW_ANY control parameter, described below.

Basic Input Output System (BIOS) support for PCPS includes a configuration flag and table entries. More specifically, a single power domain (SPD) indicator or flag may be present in a configuration and status register (CSR), e.g., as a bit of the register. This bit may be locked down and read only once on system reboot/reset. In an embodiment, when this bit is set it is an indication that the processor is to act as a single domain for power purposes (and thus all cores operate at a single P-state). Instead when this bit is reset, it is an indication that each core of the processor is to act as a single domain for power purposes (and thus each core can operate at an independent P-state).

PCPS support may also be realized via ACPI table entries in BIOS per power domain. To realize PCPS in a N physical core system, N ACPI power domain entries can be specified. To treat all cores as mapping to a single power domain, a single entry of these multiple entries can be specified. Or a separate entry can be provided to be used when all cores are to map to a single power domain.

On system reboot, the ACPI tables and the SPD flag are read once. If there are multiple power domain entries and the SPD flag is not set, the full feature of PCPS can be made transparently available to systems deployed with a legacy operating system that does not have support for PCPS.

According to the ACPI specification, different power management modes are possible, with each mode indicating what effect a performance state change request from a thread has on a power domain. In general, three different power management modes are available, namely HW_ALL, SW_ALL and SW_ANY. In general, HW_ALL and SW_ALL operate similarly in that a highest requested performance state of the active threads within a given power domain is selected as the performance state to be applied to that power domain. Instead, the SW_ANY power management mode is to cause the performance state of a power domain to be that of the performance state most recently requested by an active thread on that domain.

Referring now to Table 1, shown is behavior to support ACPI modes of HW_ALL, SW_ALL, SW_ANY using this SPD flag along with a single power control (PCTL) flag, which may be available on a miscellaneous power management machine specific register (MSR) (e.g., MISC_P-WR_MGMT (MSR 0x1aa)), and generally provides the configuration of either single power control or multiple domain power control, depending on a state of the flag.

TABLE 1

| Single Power Domain (flag) | Single PCTL (flag) | ACPI Mode(s) | Core Frequency(s) | Description |
|---|---|---|---|---|
| 0 | 0 | HW_ALL SW_ALL | Multiple (PCPS) | Core P-state is maximum of thread P-state requested on active threads in power domain, in this case comprised of a single physical core |
| 0 | 1 | SW_ANY | Multiple (PCPS) | Core P-state is last requested thread P-state on threads associated with the power domain, in this case comprised of a single physical core |

TABLE 1-continued

| Single Power Domain (flag) | Single PCTL (flag) | ACPI Mode(s) | Core Frequency(s) | Description |
|---|---|---|---|---|
| 1 | 0 | HW_ALL SW_ALL | Single | All cores at single P-state equal to the maximum P-state requested by active hardware threads in the power domain, which is comprised of all the physical cores in the package |
| 1 | 1 | SW_ANY | Single | All cores at single P-state equal to the last requested P-state across all threads in package |

Table 2 shows an illustration of behavior for legacy OS's based on whether BIOS to support PCPS is provided.

TABLE 2

| Legacy_OS | BIOS_change | Single PCTL | Effect | Description |
|---|---|---|---|---|
| X | 0 | 0 | 1 power domain | Single P-state, max across all threads P-state |
| X | 0 | 1 | 1 power domain | Single P-state, last requested thread P-state |
| X | 1 | 0 | N power domains | PCPS, max P-state of threads on each core |
| X | 1 | 1 | N power domains | PCPS, last thread request per core |

Note in the above Table 2, X is a don't care, and N corresponds to the number of cores in the processor.

Referring now to Table 3, shown is pseudocode for P-state handling that leverages the configurability of PCPS in accordance with an embodiment of the present invention.

TABLE 3

Event: OS Pstate or Cstate request on any logical core (namely, a hardware thread), say t, Pstate(t)
// If the Cstate is C0, implies logical core active, and hence its Pstate is considered
// if Cstate > 0, that is inactive, the associated Pstate is disregarded
   if (single-power-domain) { //SPD
      if (SW_ANY mode) { // Single_PCTL flag/bit
         new_Pstate = Pstate(t); // available on IO_FIRMCONFIG_MSR
      } else { // SW_ALL & HW_ALL
         new Pstate = max (Pstate of all logical cores that are in C0 Cstate (aka active));
      // Hardware consolidation of max Pstate across logical cores associated with a
//physical core speeds this as opposed to firmware computation of the same across all
//physical cores.
      } else { // SW_ALL & HW_ALL & SW_ANY
      // Implemented in hardware and available as a field in a physical core level
IO register
         New_Pstate = max (Pstate of all sibling logical cores on associated physical core associated in C0 Cstate);
   }
   if (New_Pstate != Old_Pstate) {
      // initiate core operating point change flow
   }

As seen in Table 3, it is possible for a user to define multiple power domains in the BIOS and disable the SPD flag to reap PCPS power and performance benefits, and further to set the single PCTL flag accordingly to determine whether all active threads or the most recently requested thread P-state determines core P-state. Other users may use PCPS while supporting ACPI modes including HW_ALL and SW_ALL. Also, deployments with a legacy OS may disable the SPD flag and enumerate a power domain entry per physical core. For deployments that seek to run all their cores at the same frequency at all times, such as a cloud service environment where simplifying client billing is sought, regardless of OS (legacy or new), the SPD flag can be set, ensuring that all cores operate at the same voltage/frequency point and are using resources equally in that respect. As an example, when a cloud service provider installs a smarter metering system, PCPS may be enabled and more performance and power savings are obtainable and the user can be charged accordingly. In domains where greater single threaded performance is desired, PCPS with the SPD flag reset may be the optimal deployment. A customer who seeks to benefit from new processor hardware and not have the time to experiment with PCPS can run a system with SPD flag set.

Figure 2:
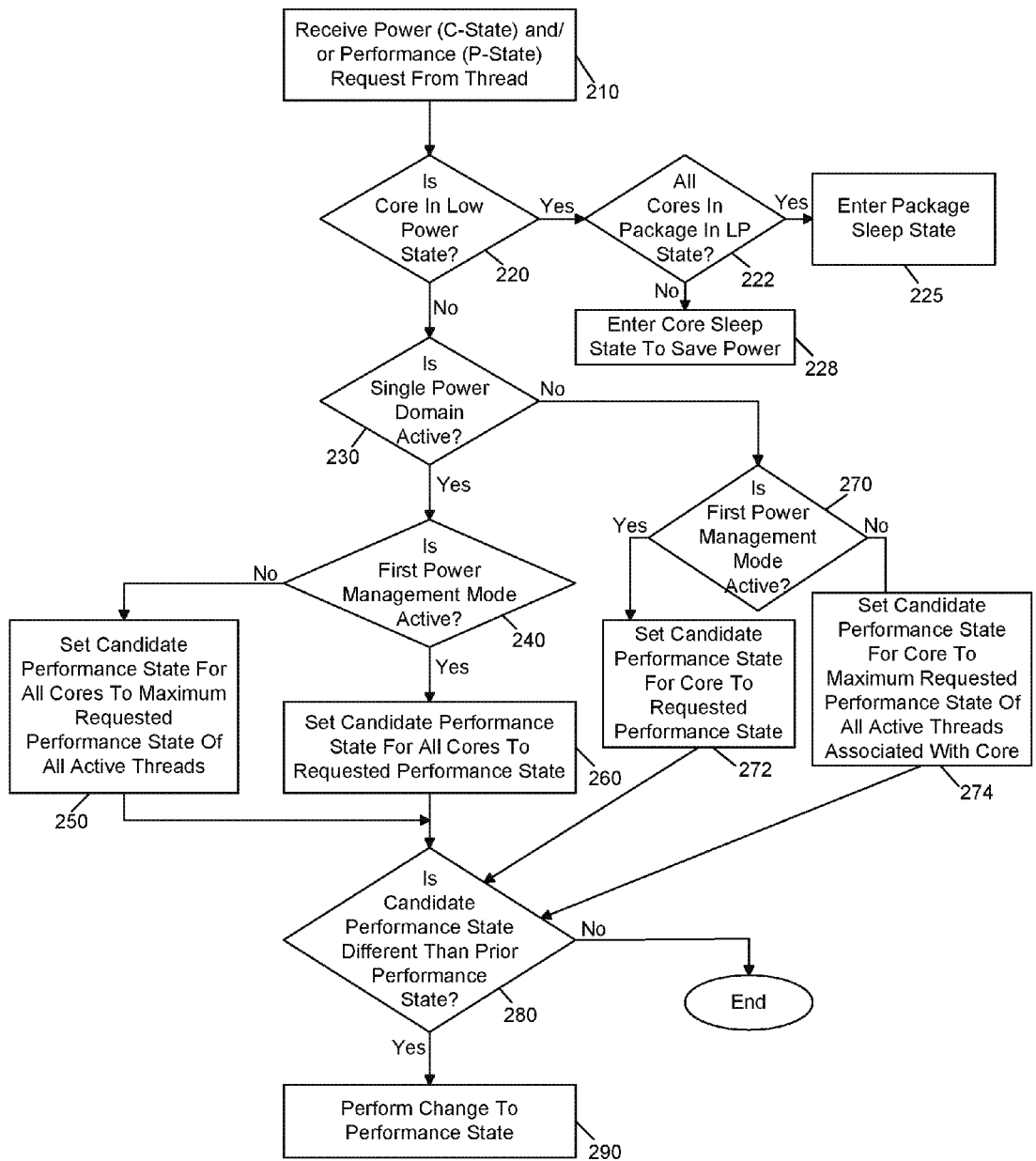
FIG. 2 is a flow diagram of a method for handling performance state requests received from threads within a multicore processor in accordance with one embodiment of the present invention.

Referring now to FIG. 2, shown is a flow diagram of a method for handling performance state requests received from threads within a multicore processor. As seen, method 200 begins by receiving a power and/or performance state request from a thread (block 210). Note that this thread may be a hardware thread or logical core, and the request may be received in a power controller of the processor such as a power control unit (PCU). Alternately, the request may be received within a core of the processor on which a PCPS algorithm executes.

Still referring to FIG. 2, at diamond 220 it can be determined whether the core on which this thread is executing is in a low power state. If so, the request can be ignored and control passes to diamond 222 where it can be determined whether all cores in the package are in a low power state. If so, control passes to block 225 where the package can enter a sleep state. If instead at diamond 222 it is determined that not all cores in the package are in a low power state, control passes to block 228 where this core can enter a sleep state to save power. Note that if all the threads on a given core are in a low power state, the core may thus be put into a sleep or other low power state to enable redistribution of power to other cores that are more active. Thus when a core enters into a low power state, the power otherwise allocated to that core may be harvested for distribution among other cores, e.g., to enable one or more of the cores to enter into a turbo mode. If instead all cores in a package are in a sleep state, the package overall may be placed into a sleep state to reduce power consumption.

If the core is not in a low power state, control passes to diamond 230 where it can be determined whether the processor is configured to operate in a single power domain mode. In an embodiment, this determination may be based on an SPD indicator, e.g., present in a control register of the processor.

Referring still to FIG. 2, if at diamond 230 it is determined that the processor is operating in a single power domain mode, control passes to diamond 240 where it can be determined whether a first power management mode is active. In an embodiment, this first power management mode may correspond to an ACPI mode of SW_ANY. In an embodiment, the determination of the power mode in which the processor is operating can be obtained from a field of a MSR. In turn, other power modes including a HW_ALL mode and a SW_ALL mode can be determined by OS behavior, which tracks at a high level application behavior and policy and is the master that sets the per thread register values for P-state changes.

Thus at diamond 240 if it is determined that the first power management mode is active, control passes to block 260 where the candidate performance state for all cores can be set to the requested performance state. That is, in this first power mode, the most recent performance state request is controlling and thus all cores may be commonly set at this requested performance state.

If instead at diamond 240 it is determined that the first power management mode is not active, control passes to block 250 where the candidate performance state for all cores can be set to a maximum requested performance state of all active cores. In this situation, a scan across the active threads of all cores can be made to thus determine the maximum requested performance state and to enable control of the processor to this performance state.

If it is determined that the processor is operating in a single power domain mode, control passes to block 270 where it can be determined whether the first power management mode is active. If so, control passes to block 272 where the candidate performance state for the core can be set to the requested performance state. Otherwise if the first power management mode is not active, control passes to block 274, where the candidate performance state for the core can be set to the maximum requested performance of all active threads on the core. In this way, a per core performance state operation can be realized and each core can execute at an independent performance state. As such, greater performance can be achieved while conserving power as possible.

From all of blocks 250, 260, 272, and 274 control next passes to diamond 280 to determine whether the newly set candidate performance state is different than the prior active performance state. If not, the method may conclude. Otherwise, if a difference in performance states exists, control passes to block 290 where the power controller can perform a change to thus move the appropriate power domain operation to the newly set performance state. Although shown at this high level in the embodiment of FIG. 2, understand the scope of the present invention is not limited in this regard.

As described above, UFS enables dynamic control of uncore interconnect frequency to better allocate power between cores and uncore to increase performance. Embodiments may monitor various information, including but not limited to interconnect traffic, core activity levels, and other information to determine usage of uncore circuitry of a processor, to detect congestion and under-utilization. This information can be used to adapt the operating frequency of such circuitry to changing workload characteristics, and thus gain power and performance benefits. Note that this uncore circuitry can include interconnect structures to couple cores to caches and other on-chip and off-chip circuitry, one or more cache memories, as well as certain non-core logic circuitry such as a PCU and so forth.

When a processor package is in an idle state, namely when all of the cores are in a low power state, the only traffic stems from attached input/output (IO) devices and sibling sockets in a multi-socket system. In such cases, the interconnect operating frequency may be reduced to a value sufficient to comfortably meet the IO and intersocket traffic needs, which is referred to herein as an IO traffic threshold frequency. Although the scope of the present invention is not limited in this regard, in some embodiments this threshold frequency may be between approximately 1.2 and 4.0 gigahertz (GHz) as examples.

Different information regarding actual usage of an interconnect may be evaluated in determining an appropriate frequency for operating the uncore. In one embodiment, such information can be obtained from a variety of sensors and detectors, including the core activity sensor and core stall sensor described above. Using information from these adapt the uncore frequency as necessary. The goal of an uncore frequency scaling algorithm in accordance with an embodiment of the present invention is to allocate power between core and interconnect power planes, to increase overall system performance and possibly save power. In each power plane both voltage and frequency can be modified.

Referring now to Table 4, shown is pseudocode for a uncore frequency scaling algorithm in accordance with one embodiment of the present invention.

TABLE 4

```
UFS Algorithm
every ADAPT_PERIOD { // configurable period
        i = (i + 1) mode n; // n sliding window size
        int dyn_uncore_ratio = current_uncore_ratio;
        if (package_idle) { // all cores in socket idle
                dyn_uncore_ratio = max(QOS_UNCORE_FLOOR , IO_Plimit);
        } else {
                higher_uncore_ratio = min((current_uncore_ratio +
                        UFS_RATIO_INC_STEP), MAX_UNCORE_RATIO);
                lower_uncore_ratio = max((current_uncore_ratio −
        UFS_RATIO_DEC_STEP),
                        QOS_UNCORE_FLOOR );
                int recommend = 0; // no change
                if ((num_cores_stalled > (num_cores_active *
                TOLERATE_CORES_STALL_FACTOR)) ||
                        (max_uncore_traffic >= comfortable_max(current_uncore_ratio)) {
                        recommend = +1;
                } else if (max_uncore_traffic <= comfortable_max(lower_uncore_ratio)) {
                        recommend = −1;
                }
                // recommendBuf is a circular buffer, to preserve the last n
                recommendations for hysterisis
                recommendBuf[n] = recommend;
                // observe trend
                int trend = sum (recommendBuf[i]) 0 <= i < n
                if (trend == increase_ threshold) {
                   dyn_uncore_ratio = higher_uncore_ratio;
                } else if (trend == decrease_ threshold) {
                   dyn_uncore_ratio = lower_uncore_ratio
                } else { // no change
                   dyn_uncore_ratio = current_uncore_ratio;
                }
        }
        if (dyn_uncore_ratio != current_uncore_ratio) {
           for (0 <= i < n ) recommendBuf[i] = 0; // reset after recommending change
           i = 0;
        }
        return dyn_uncore_ratio;
}
``` sensors, information regarding uncore contention, pressure in the shared cache, or bandwidth limitations may be discerned. However, core stalls do not provide visibility into localized congestion along the interconnect, nor conclusively indicate under-utilization, information regarding both of which may be valuable for better power utilization and performance.

To this end, embodiments may also provide a set of distributed configurable traffic sensors that can be used to measure traffic at various points within the uncore circuitry. In one embodiment, such sensors can be located at each interface unit coupled to the interconnect, e.g., at each interconnect stop, where the interconnect is configured as a ring interconnect. However, other topologies can be a ring, mesh, star, tree, among many others. The traffic sensors may be used to measure traffic along each direction, of each data type, and along each interconnect segment. Embodiments thus may monitor usage of an interconnect to detect traffic congestion, under-utilization, and uncore contention.

The PCU receives all sensor data and uncore frequency control logic of the PCU may be used to analyze the data to In the code shown, uncore_floor is a quality of service (QoS) floor setting, meaning the lowest uncore frequency allowed, while IO_Plimit is a floor adequate to sustain traffic comfortably from sibling sockets in a multi-socket assembly and/or attached IO devices. This parameter may be a dynamic quantity based on traffic from these components.

Figure 3:
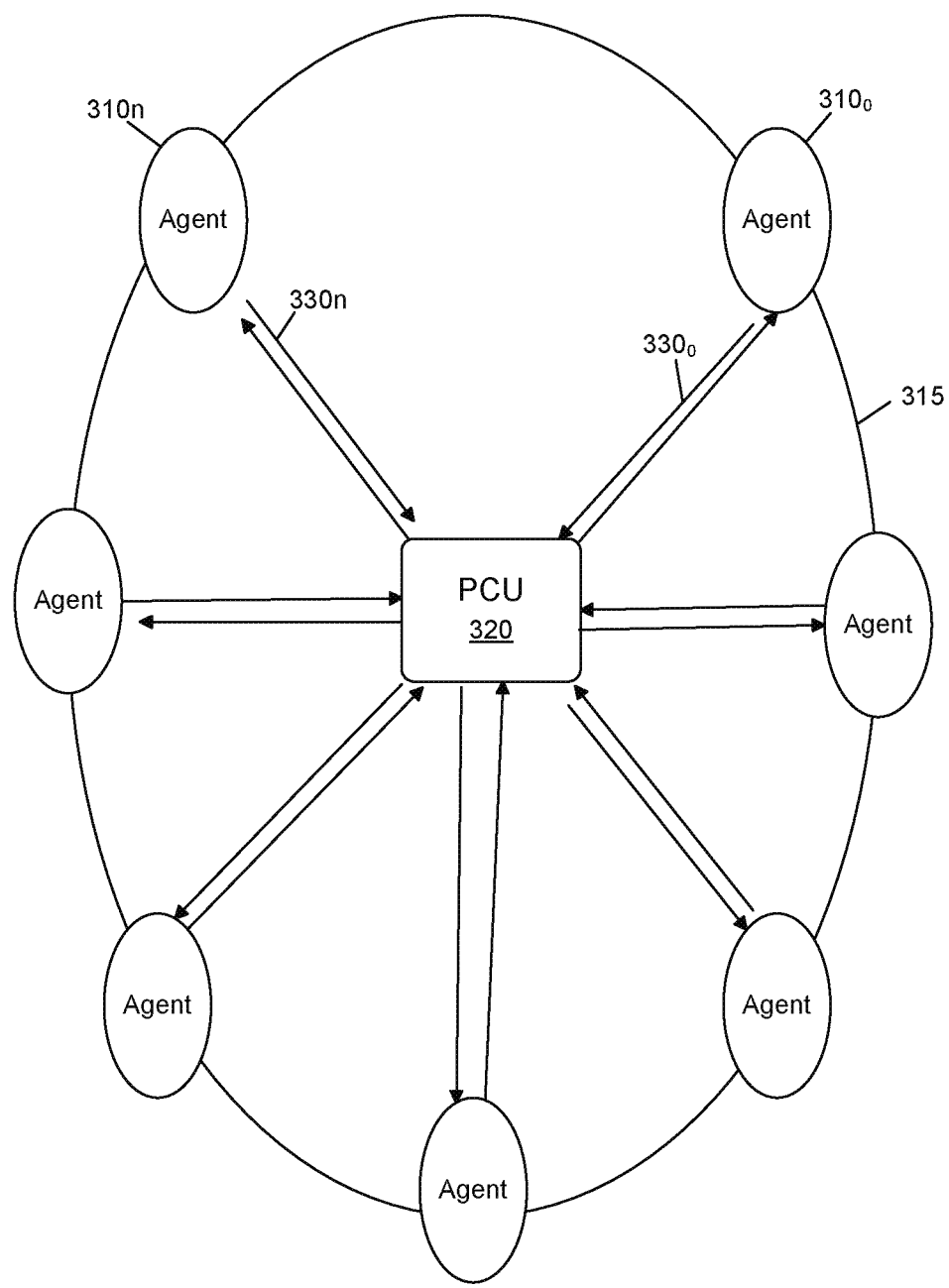
FIG. 3 is a block diagram of a processor in accordance with another embodiment of the present invention.

Referring now to FIG. 3, shown is a block diagram of a processor in accordance with another embodiment of the present invention. As shown in FIG. 3, a processor 300 may include a plurality of agents $310_0$-$310_n$. Each of these agents can correspond to a given traffic agent that can both act as a sink and a source of traffic communicated between the agents via an interconnect 315, which in the embodiment shown in FIG. 3 is a ring interconnect. Although the scope of the present invention is not limited in this regard, many different types of agents including cores, processing engines, fixed function units, IO connections, memory, inter-socket connections among many others may be present.

To enable communication of traffic information for use in uncore frequency control, further interconnections 330a-330n may be provided between each agent 310 and PCU 320. As seen, bidirectional paths may be present such that control information, e.g., to configure traffic sensors associated with each interconnect stop can be communicated. In addition, control signals to poll for or push information can be provided. In turn, the corresponding traffic sensor data is communicated to PCU 320.

Note that the illustration in FIG. 3 of the various agents 310 is generally understood to include a small portion of interconnect logic (generally referred to as an interface unit) including buffers, control logic and so forth to enable communication of information between the agents via interconnect stops that interface between a given agent and interconnect 315. In addition, these interconnect stops each may include one or more traffic sensors. Although located at this position in certain embodiments, understand that the traffic sensors could be otherwise located such as at interfaces of the agents themselves, or at other portions along an interconnect.

Figure 4:
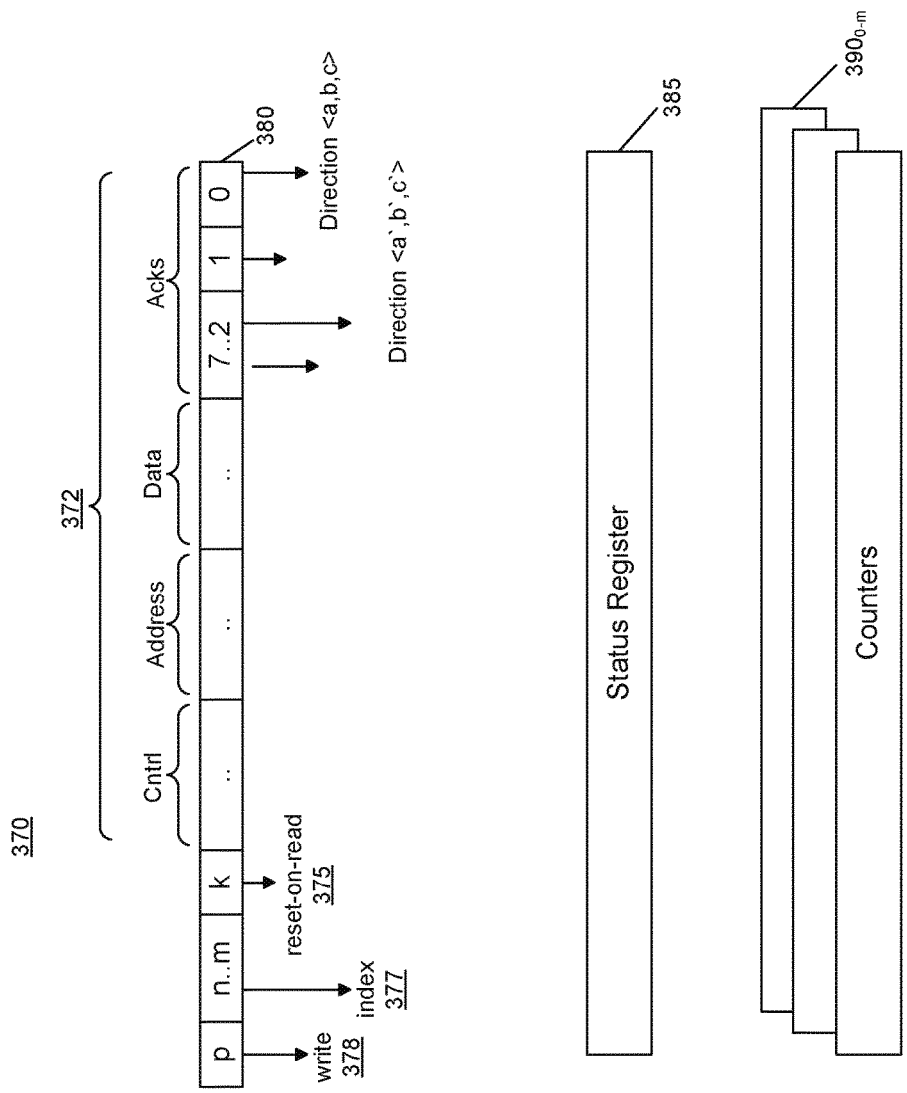
FIG. 4 is a block diagram of a traffic sensor in accordance with an embodiment of the present invention.

Referring now to FIG. 4, shown is a block diagram of a traffic sensor in accordance with an embodiment of the present invention. As shown in FIG. 4, traffic sensor 370 may be a single traffic sensor located at an interconnect stop or other interface logic associated with an interconnect. In general, traffic sensor 370 may include various storages to provide for control and configuration of the sensor as well as to enable maintaining traffic measurements in accordance with an embodiment of the present invention.

As seen in FIG. 4, traffic sensor 370 may include a control register 380. In various embodiments, control register 380 may include a plurality of fields, each of which can be set under control of, e.g., PCU logic. As seen, control register 380 can include a traffic type field 372 for each type of communication possible on the interconnect, including a control field, an address field, a data field, and an acknowledgement field. In addition, control register 370 may include a reset-on-read field 375, an index field 377, and a write field 378.

In general, the traffic type fields 372 (e.g., the control, address, data and acknowledgment fields) each can include a plurality of bits each to indicate whether traffic of a particular direction is to be counted. Accordingly, these traffic type fields can act as a filter such that the traffic sensor only counts traffic in certain directions, e.g., for efficiency and power consumption purposes. In one embodiment, three dimensions of directions can be controlled, namely north/south, east/west, in/out. In one embodiment, a logic high value for a given bit of any of these fields indicates that traffic of the corresponding type in the indicated direction is to be counted.

Note that the count operations themselves may occur by incrementing a value in a corresponding one of multiple counters $390_0$-$390_m$. Each such counter may maintain a count of a data type along a given direction tuple.

Referring back to control register 370, reset-on-read field 375 may be set to indicate that counters 390 should be reset on a read operation. In turn, index field 377 may be used to index an individual count or the maximum of all counts. That is, in an embodiment a set of bit values may correspond to the counter to be read. For example, for 6 different counters (e.g., one kind of traffic type, up/down, in/out, left/right), 3 bits may uniquely index one of the counters. Instead if index field 377 is set to all zeros, a maximum of all counts may be provided. Finally, a write field 378 may be set responsive to a poll request so that the indicated counter (e.g., according to index field 377) can be written into a status register 385. In various embodiments, status register 385 may thus contain the value to be read or be written and can be sized to hold the maximum traffic count possible. Without loss of generality, traffic can be determined as a function of traffic of each type and direction. Thus varied combinations of the traffic are possible, such as weighting data more than acknowledgements.

Thus to effect a write of control register 370, the PCU may provide a value to be stored in status register 385 and then on a write operation, e.g., as indicated by write field 379, the value in status register 385 can be stored into control register 370. In so doing, a flexible configuration of the traffic sensors is possible independent of each other. Although shown at this high level in the embodiment of FIG. 4, understand that the scope of the present invention is not limited in this regard. Furthermore, understand that traffic sensor 370 shown in FIG. 4 can be replicated at every interconnect stop. In many embodiments, a single traffic sensor may be associated with each interconnect stop, e.g., at an input port or an output port, but implementations may avoid providing two such traffic sensors per interconnect stop for purposes of reducing real estate and power consumption. Further, understand that the PCU (e.g., PCU 320 of FIG. 3) may include a sensor mask to store information to selectively control operation of the sensors. In one embodiment, this mask may include a plurality of bits each associated with a given traffic sensor. In this way, sensors associated with interconnect stops can be turned off to save power and processing time. For example, bits of a first (e.g., high) state may enable the corresponding sensor and bits of a second (e.g., low) state may disable the corresponding sensor. In this way, interconnect stops that act as relays (or less critical stops) can be disabled.

Thus in an embodiment, multiple traffic sensors can be provided, each to measure communication traffic at a point of an interconnect at which an agent is coupled. In such embodiment, the sensor can include a control storage to store control information to indicate a direction and a type of communication traffic to be measured, a status storage to store a traffic measurement and to provide the measurement to a controller responsive to a request, and multiple counters each to store a traffic measurement for a direction and communication traffic type. Note that the controller can be incorporated into a PCU, and where the controller can operate to set the control storage and read or be communicated the traffic measurement from the status storage. The controller may also include a sensor mask to store a set of indicators, each associated with a sensor and having a first value to disable the corresponding sensor and a second value to enable the sensor.

According to various embodiments, UFS control may be configured using a UFS enable/disable flag in a CSR register, which may be readable once on system reboot. Note that this CSR may be the same CSR that stores the SPD flag, or it may be a different CSR. In addition, a user can configure an UFS adapt periodicity, which in an embodiment may be set in terms of milliseconds, and may also be stored in a CSR such as a system agent power management register. To perform UFS, power control circuitry uses data stored in an MSR that provides ceiling and floor values for uncore frequency.

In this way, a user can configure whether he wants: a full-featured UFS with its associated power/performance benefits (and further providing the ability to control UFS adapt periodicity); have the uncore interconnect operate at core frequency (provided single power domain operation is enabled); or a fixed frequency uncore.

Customers having acceptable performance with their current deployment buying new server hardware could opt for uncore interconnect following core frequency so that these customers would instantly benefit from faster processor hardware. Customers/applications sensitive to memory latency, data retrieval time or so forth, such as a search engine application could opt to disable UFS and set the floor and ceiling uncore frequency to obtain a fixed uncore frequency. Some users may choose to experiment to determine an ideal floor value to meet a given quality-of-service (QoS) metric. With an appropriately set floor frequency, enabling the UFS feature would bring additional power/performance benefits.

For market segments with known application set characteristics, UFS adapt periodicity tuning is also possible by way of setting an observation window length, which in an embodiment can be stored as a field of a control register as described above. In an embodiment, this periodicity tuning field may have a value that is set in integer multiples of a millisecond. The longer the observation window length that is selected, the less responsive is uncore frequency control to changes in application set behavior. Very short windows on the other hand may hinder forward progress of a given workload by way of thrashing.

Referring now to Table 5 shown is pseudocode for implementing configurable UFS control in accordance with an embodiment of the present invention.

TABLE 5

```
If (follow_core) {
        Update uncore frequency on every core Pstate change
} else {
        if (uncore_floor != uncore_ceiling) {
            if (time-to-run-UFS) { // can configure periodicity
                // analyze uncore interconnect traffic, core stalls, IO
            traffic, intersocket traffic
                // low → decrease uncore frequency
                // high → increase uncore frequency
            }
        } // else fixed uncore frequency
}
```

In the code above of Table 5, if the UFS flag is disabled, the uncore frequency may follow that of the core frequency (assuming a single power domain implementation) such that the uncore frequency is updated on every update to core frequency. Otherwise, if the configured settings for uncore floor and ceiling values are not the same, and the adapt period is met, an analysis can be made of various information including uncore interconnect traffic, core stalls, IO traffic, and inter-socket traffic among other information. If such an analysis determines that the uncore frequency should be reduced, such frequency reduction may occur. Instead if it is determined based on the analysis that an increase should occur, such increase may occur. Note that in the situation where the floor and ceiling values are equal, a fixed uncore frequency may be provided.

Power is non-linear with frequency when a processor is operating in the turbo range. Unless performance improvements are obtained by operating in a turbo range, the increased power consumption is unjustified. Embodiments may use Energy Efficient Turbo (EET) to aid in the determination of core operating frequency in the turbo range based on core metric information such as core stalls (degree of waiting of all logical threads associated with a physical core for data loads or stores). Stalls are a function of workload mix and cache/memory access pattern of the application running on the core. Cache-friendly applications are those whose entire working set fits in the cache. In contrast, cache streaming or thrashing applications constantly seek new data and sweep through the cache. Increased stalls indicate the application is unlikely to benefit from being run at a higher frequency without a commensurate reduction in stalls.

An EET algorithm that seeks to ramp a turbo-seeking core to a frequency at which its stalls for memory are tolerable, as determined by a configurable threshold, that is operating efficiently, such that power burned is proportional to performance obtained. The algorithm also takes into consideration any user/OS specified energy performance bias (EPB). In one embodiment, the EPB may be based on user input to an OS-based user preference menu to indicate a user's preference as to a power/performance tradeoff. With a performance bias, an application running on a core that is not stalled may be granted a maximum turbo frequency, but with an energy bias the core may have its frequency incremented by a unit step.

To effect an EET algorithm, embodiments may detect core stalls and core active cycles, e.g., via the core activity sensor and core stall sensor, to determine the proportion of cycles a core is stalled compared to the cycles it is active, termed core-centric unproductive time. This core-centric unproductive time can be meaningful and reliable regardless of the actual core and uncore interconnect operating frequencies, and thus serves well to classify a core as stalled or not using a single threshold. In various embodiments, this threshold may be configurable and can be a function of the system EPB.

The EET algorithm periodically analyzes all cores granted turbo mode to determine whether their frequency should be increased, decreased or left unchanged based on whether the core has been classified as stalled or not over the observation interval. Cores running applications that fit in their private cache over consecutive observation cycles (provided there exists power budget and no electrical, thermal or other constraints being violated) will reach the maximum turbo frequency. In scenarios where the workload mix changes and there is increasing cache contention, over time the turbo frequency of the affected cores will be reduced, e.g., steeply if the system is configured for energy bias or more slowly if configured with performance bias.

Embodiments may implement the EET algorithm in firmware such as firmware of a PCU of the processor. This algorithm may take as input hardware sensor data regarding core stalls and core active cycles and any user/operating system configured energy performance bias to adapt the core operating point.

Also understand that an EET algorithm may have wide flexibility as it uses configurable values for thresholds and the periodicity with which it revisits turbo-granted cores. Further, the configuration can be a function of the energy performance bias specified. The arithmetic expression used to adapt the core frequencies can be a function of the core stalls. A function is reasonable as long as it meets the following caveats: core frequency monotonically rises under favorable stall conditions and monotonically falls under unfavorable stall conditions.

As to the thresholds, assume a customer with a computer system including a processor in accordance with an embodiment of the present invention and a given OS runs their own application and has their own power, performance and quality of service needs. These values will be a function of the EPB that the user/OS controls. In some embodiments, there may be a graphical user interface (e.g., dashboard) or other hooks to set these thresholds based on EPB. Note that each physical core may have an EPB corresponding to the minimum of its logical core EPBs. Referring now to Table 6 are example threshold values for different EPBs. Note that these values can be tuned post-silicon using benchmarks.

TABLE 6

| EPB Value | Active Threshold | Deny Threshold (first) | Grant Threshold (second) |
|---|---|---|---|
| Energy | 20 | 50 | 10 |
| Balanced | 20 | 50 | 10 |
| performance | 20 | 60 | 20 |

In some embodiments, a processor may provide predetermined values for performance, balanced and energy performance bias. In some embodiments, a second (grant) threshold may be less than a first (deny) threshold by 2 to 8 times or more. In one embodiment, these are real numbers, representing a fraction of observation window time.

Without loss of generality, Table 7 below is pseudocode of an implementation of an EET algorithm in accordance with one embodiment of the present invention.

TABLE 7

```
Every Revisit Period { // period configurable, about 1 millisecond
    P1 = MAXIMUM_GUARANTEED_RATIO; // SKU based constant
    MAXIMUM_TURBO; // SKU based constant
    GRANT_K // a low configurable constant 0 < GRANT_K < 1.0
    DENY_K // a high configurable constant; DENY_K > 2 * GRANT_K
        // 0 < DENY_K < 1.0
    for each core granted turbo {
        if (core_active_cycles >= min_activity_threshold) { ; // configurable
            //Demote or promote or no-change?
            curr_pstate ; // retrieve current pstate of core
            core_stall_cycles; // read sensor data from core
            bias ;// retrieve energy-perf bias of core
        if (core_stall_cycles >= core_active_cycles * DENY_K ) { // demote
                if (energy(bias)) { // energy bias
                    new_Pstate = P1 ; // exit Turbo
                } else if (balance(bias)) {
                    new_Pstate = ((P1 + curr_pstate)/2 ; // less Turbo
                } else { // performance bias, a little less turbo
                    new_Pstate = maximum(curr_pstate – 1, P1)
                }
        } else if (core_stall_cycles >= core_active_cycles * GRANT_K ) {
                // promote .. further
                if (energy(bias)) { ; // slow increase
                    new_Pstate = min (P1 + 1, MAXIMUM_TURBO)
        } else if (balanced(bias)) { ; // faster increase
                    new_Pstate = (MAXIMUM_TURBO + curr_pstate)/2
        } else { // performance bias, shoot up to maximum turbo
                    new_Pstate = MAXIMUM_TURBO;
                }
        } // else in hysterisis region, no change
        // apply all constraints
        new_pstate = min(new_pstate,
                        min(Electrical design point, Thermal, SKU, other
limits));
    } // if_active
} // for-each loop
```

Note in Table 7 that after determination of a candidate performance state (new_pstate), a minimum function is applied, which includes electrical design point considerations, which is applied last because it depends on the number of cores seeking to turbo and their degree of turbo. Another parameter of the minimum function is a thermal constraint, as past activity and environment affects processor temperature and thus how much the cores may turbo consequently without melt down.

EET may be made available only in the context of PCPS, and can be enabled or disabled using configurable parameters in accordance with an embodiment. In one such implementation, an EET enable indicator such as an EET flag of a BIOS setting can be used to enable/disable EET. When EET is enabled, while a processor is operating in the turbo range, individual cores can operate at different, independent frequencies depending on the stalls encountered by the given core. In contrast, when EET is disabled, a turbo budget is equally distributed among all cores seeking to operate at a turbo mode frequency.

As a further configurable parameter, an EET adapt period can be provided as a user controlled parameter by way of setting an adapt period length, which in an embodiment can be stored in a field of a control register. In an embodiment, this adapt period field may have a value that is set in integer multiples of a millisecond.

As examples of use cases for these EET configurable parameters, a cloud server deployment may opt to turn off EET and in so doing distribute all turbo budget equally among all running applications (and can optionally disable all turbo operation, allowing cores to run at most at maximum guaranteed frequency to keep cooling costs low). In a deployment where it is possible to bill based on core frequency, turbo mode operation may be turned on to enable billing on a sliding scale basis, charging exponentially more for users operating in a turbo mode. As other examples, online e-commerce centers, such as banking, airlines, or entertainment streaming may choose to enable EET and gain increased turbo performance where/when possible to meet dynamically peak load. In systems where it is desired to cap cooling and power needs, turbo mode may be disabled, in which case EET is also disabled.

Referring now to Table 8, shown is pseudocode for performing EET control in accordance with an embodiment of the present invention.

TABLE 8

```
If (turbo-enabled) {
  if (!SINGLE_POWER_DOMAIN) {
    if (EET_disabled) {
      for all turbo cores distribute turbo power budget equally
        excess_power_budget/num-turbo-cores
        operate turbo core at guaranteed_frequency + above per
          core turbo budget
    } else {
      If (turbo period) { // can adjust periodicity
        For all turbo cores {
          Based on energy efficiency policy and core stalls
          Adapt core operating frequency
        }
      }
    } else {
      Power distributed equally among all active cores
    }
  }
}
```

Thus in the code of Table 8 above, when a system is not in a single power domain mode and EET operation is disabled according to a disabled EET flag, a turbo power budget can be equally distributed to all cores seeking a turbo mode of operation by determining an excess power budget and dividing this excess power budget by the number of cores seeking turbo operation. This allows each such core to operate at a common frequency above a guaranteed operating frequency. Otherwise, if EET is enabled and an adapt period has occurred; for each core seeking to operate at a turbo mode of operation, the core operating frequency may be adjusted based on a given energy efficiency policy and various information such as core stall information. Such analysis and turbo mode frequency can be set, e.g., using the pseudocode shown above in Table 7, in one embodiment.

Figure 5:
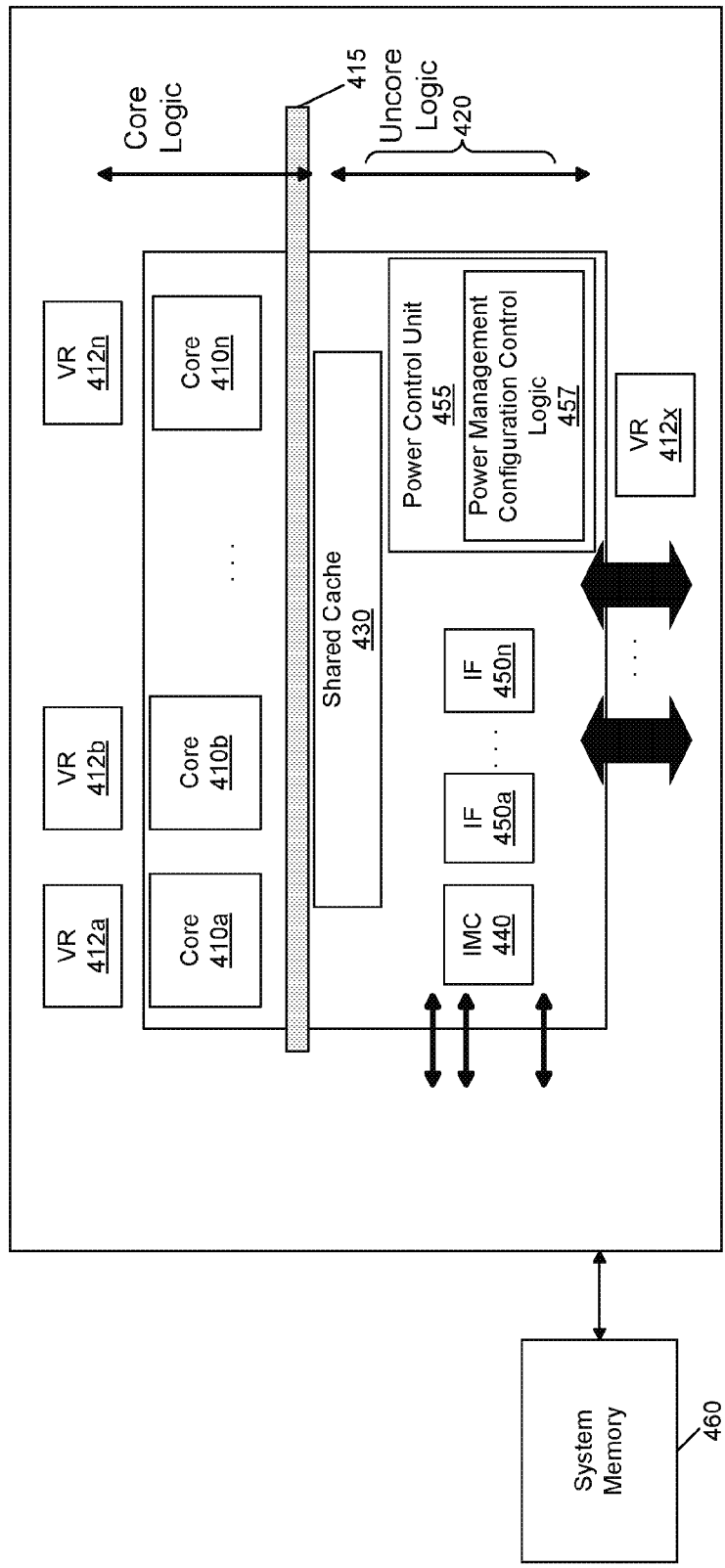
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be configured to operate at multiple voltages and/or frequencies. In addition, each core may be independently controlled to operate at a selected voltage and/or frequency, as discussed above. To this end, each core may be associated with a corresponding voltage regulator 412a-412n. While not shown for ease of illustration, understand that each core 410 can include a core activity sensor and a core stall sensor. The various cores may be coupled via an interconnect 415 to an uncore or system agent logic 420 that includes various components. As seen, the uncore 420 may include a shared cache 430 which may be a last level cache. In addition, the uncore may include an integrated memory controller 440, various interfaces 450 and a power control unit 455, as well as the distributed traffic sensors described above.

In various embodiments, power control unit 455 may be in communication with OS power management code, affected by the OS writing to a MSR, one per logical processor. For example, based on a request received from the OS and information regarding the workloads being processed by the cores, power control unit 455 may use included power management configuration control logic 457 that in one embodiment may execute firmware to enable a user to control implementation of multiple power management features in accordance with one embodiment of the present invention. Based on the above-described information, power control unit 455 can dynamically and independently control a frequency and/or voltage to one or more cores in light of the core's activity levels.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
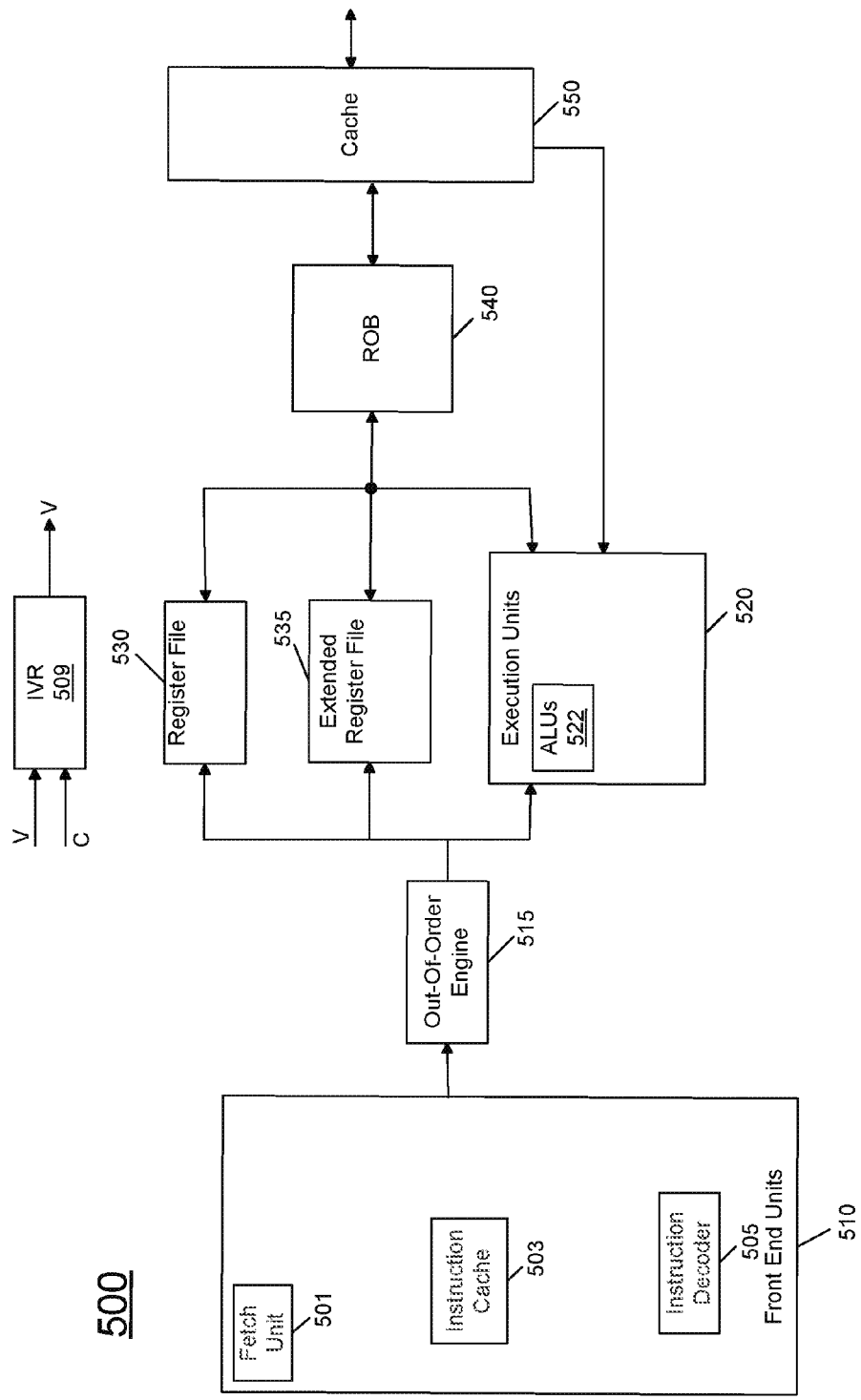
FIG. 6 is a block diagram of a processor core in accordance with one embodiment of the present invention.

Referring now to FIG. 6, shown is a block diagram of a processor core in accordance with one embodiment of the present invention. As shown in FIG. 6, processor core 500 may be a multi-stage pipelined out-of-order processor. As shown in FIG. 6, core 500 may operate at various voltages and frequencies as a result of integrated voltage regulator 509. In various embodiments, this regulator may receive an incoming voltage signal, e.g., from an external voltage regulator and may further receive one or more control signals, e.g., from uncore logic coupled to core 500.

As seen in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to reorder micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550 which in one embodiment may be a low level cache (e.g., an L1 cache), although the scope of the present invention is not limited in this regard. Also, execution units 520 can be directly coupled to cache 550. From cache 550, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of Instruction Set Architecture (ISA) that can emulate instructions and operations of a different ISA via an emulation engine and associated logic circuitry.

Figure 7:
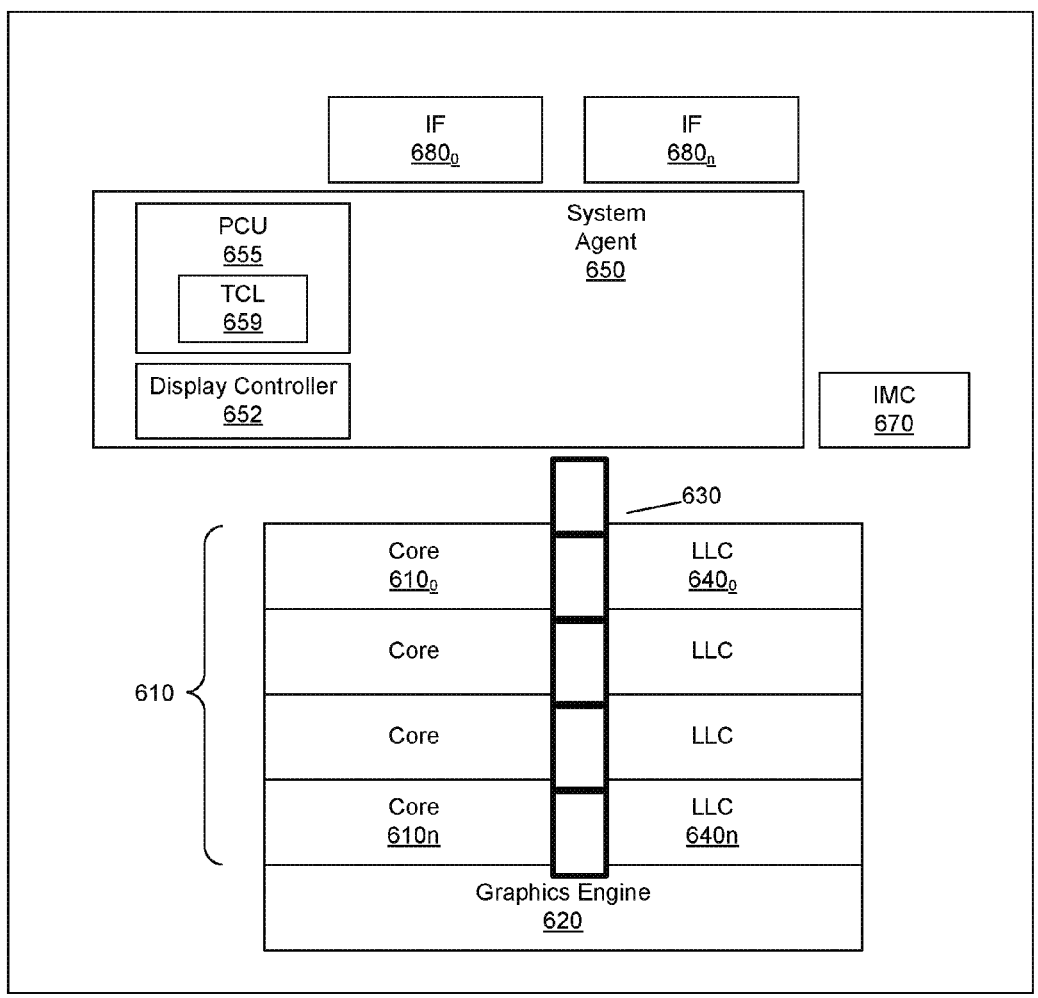
FIG. 7 is a block diagram of a multicore processor in accordance with another embodiment of the present invention.

Referring now to FIG. 7, shown is a block diagram of a multicore processor in accordance with another embodiment of the present invention. As shown in the embodiment of FIG. 7, processor 600 includes multiple domains. Specifically, a core domain 610 can include a plurality of cores $610_0$-$610n$, a graphics domain 620 can include one or more graphics engines, and a system agent domain 650 may further be present. In various embodiments, system agent domain 650 may handle power control events and power management such that individual units of domains 610 and 620 such as cores and/or graphics engines can be controlled to independently dynamically operate at an appropriate turbo mode frequency in light of the activity (or inactivity) occurring in the given unit. Each of domains 610 and 620 may operate at different voltage and/or power, and furthermore the individual units within the domains each may operate at an independent frequency and voltage based on user configuration of power management features as described herein. Note that while only shown with three domains, understand the scope of the present invention is not limited in this regard and additional domains can be present in other embodiments.

In general, each core 610 may further include low level caches in addition to various execution units and additional processing elements. In turn, the various cores may be coupled to each other and to a shared cache memory formed of a plurality of units of a LLC $640_0$-$640_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650. In one embodiment, interconnect 630 can be part of the core domain. However in other embodiments the ring interconnect can be of its own domain, and can be controlled to operate at an independent or dependent frequency based on the configurable UFS control described herein.

As further seen, system agent domain 650 may include display controller 652 which may provide control of and an interface to an associated display. As further seen, system agent domain 650 may include a power control unit 655 which can include a turbo control logic 659 in accordance with an embodiment of the present invention to control a turbo mode frequency of the cores either independently or at a common turbo mode frequency based on activity information of the corresponding core and the EET configuration.

As further seen in FIG. 7, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
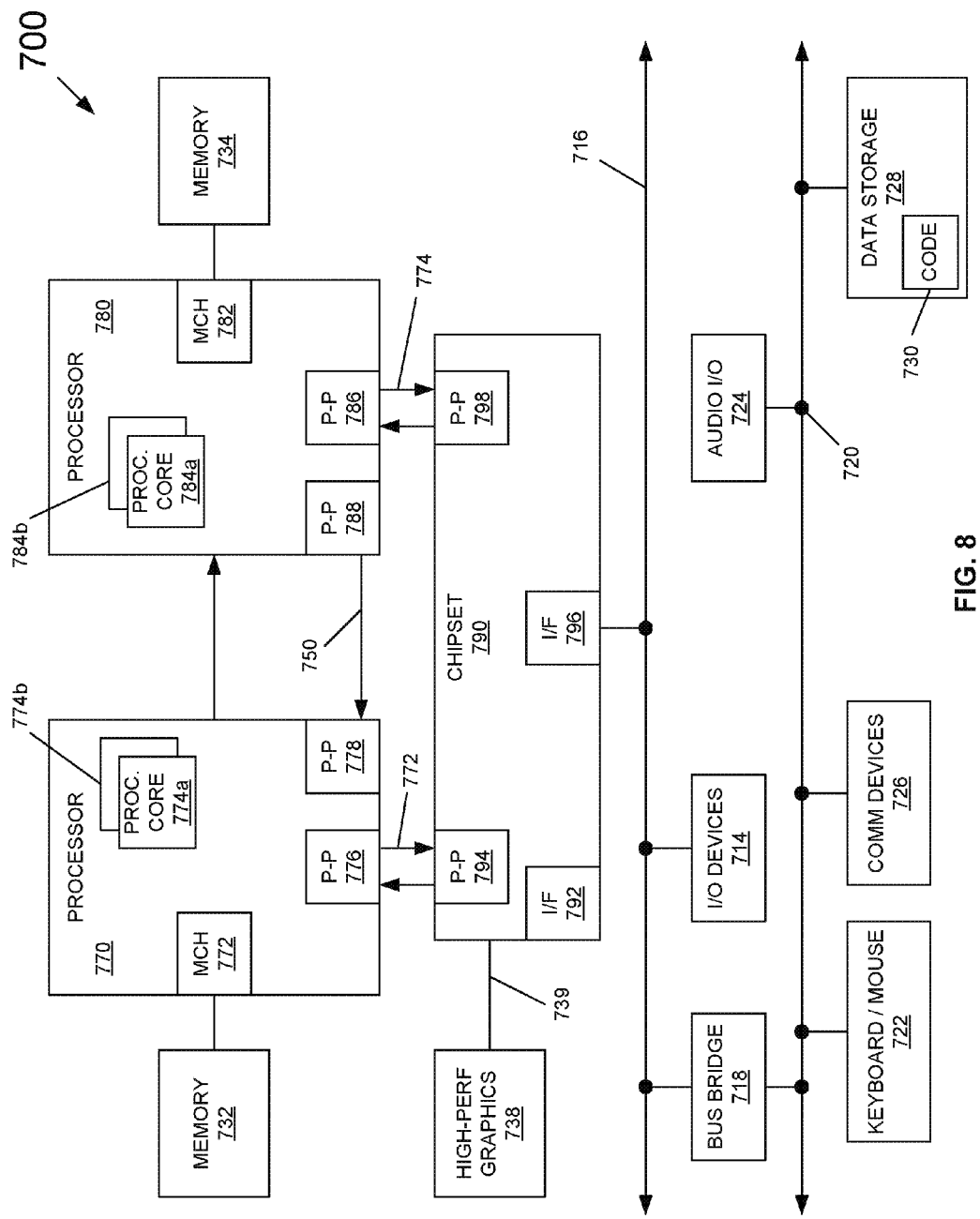
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 774a and 774b and processor cores 784a and 784b), although potentially many more cores may be present in the processors. Each of the processors can include a PCU or other logic to perform dynamic control of a permitted operating frequency greater than a guaranteed operating frequency (independently or at a common turbo mode frequency) based on core activity occurring to efficiently consume energy, as described herein, as well as enabling single domain power control or PCPS power control. Based on the configurable settings described herein, the processors may further control uncore frequency according to a given configuration.

Still referring to FIG. 8, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

By providing configuration of processor performance features, and facilitating their mixing and matching, a single processor can better meet the needs of different market segments without an explosion of SKUs. By providing a SPD indicator as described above, in conjunction with firmware (hardware and software support) a processor can function both as a prior generation product and a new full featured product seamlessly and further can enable a legacy OS-based system to exploit PCPS in a manner that is invisible to the OS.

By providing configurable control of UFS, an interconnect system can operate where uncore frequency follows core frequency, or as a fixed uncore frequency product, or as a dynamic workload sensitive adaptive interconnect system.

In addition, the periodicity parameter allows control of system response speed to workload changes.

The EET enable/disable feature allows equal distribution of available turbo budget among turbo requesting cores or more careful control, e.g., based on application memory dependency characteristics.

Using embodiments of the present invention, latency sensitive customers can set an uncore frequency floor high enough to meet QoS needs, or set the floor and ceiling to the same value to turn off UFS. Customers who seek to benefit from new hardware but not new power features can turn off all of the above-described power management features. Alternately users such as cloud server usage models could disable these features until such point as support to bill their customers/applications based on usage is available. For other users such as in-house data centers, all of the above-described power management features can be exploited to gain power/performance benefits. Finally, legacy OS customers can use these features although they are invisible and not supported by the OS.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a plurality of processors;
    a processor interconnect to communicatively couple two or more of the plurality of processors;
    a system memory comprising a dynamic random access memory communicatively coupled to one or more of the plurality of processors over a memory interconnect;
    at least one of the plurality of processors comprising:
        a plurality of cores formed on a single semiconductor die, a core of the plurality of cores to execute one or more threads;
        the core of the plurality of cores comprising a fetch unit to fetch instructions from an instruction cache, a decode unit to decode the instructions and a plurality of execution units to perform out-of-order execution of the instructions;
        one or more control registers to store a first indication that two or more cores of the plurality of cores are to operate at independent performance states comprising active power states in which the two or more cores are to operate at different frequencies and a second indication that a first set of cores are to operate at a common performance state comprising an active power state in which the first set of cores are to operate at a common frequency;
        a plurality of voltage regulators formed on the single semiconductor die, a voltage regulator of the plurality of voltage regulators associated with one of the plurality of cores;
        a power controller formed on the single semiconductor die, the power controller to control the plurality of voltage regulators to provide a voltage and/or frequency to a first core of the plurality of cores independently of a voltage and/or frequency to one or more other cores and to determine whether to update the voltage and/or frequency of the first core based on a workload of the first core, thermal constraints, and activity counters; and
        at least one additional voltage regulator formed on the single semiconductor die and associated with processor circuitry external to the plurality of cores, the at least one additional voltage regulator to allow the processor circuitry external to the plurality of cores to operate at a different voltage and/or frequency than one or more cores of the plurality of cores.

2. The system of claim 1, further comprising at least one data communication device communicatively coupled to at least one of the plurality of processors.

3. The system of claim 1, further comprising at least one storage device communicatively coupled to at least one of the plurality of processors.

4. The system of claim 1, wherein the at least one of the plurality of processors comprises a cache shared by two or more of the plurality of cores.

5. The system of claim 1, further comprising an audio device communicatively coupled to at least one of the plurality of processors.

6. The system of claim 1, wherein the system comprises a mobile device.

7. The system of claim 1, wherein the system comprises a tablet computer.

8. The system of claim 1, wherein the core of the plurality of cores is to execute at a performance state most recently requested by a thread that is to execute on the core.

9. The system of claim 1, wherein the core of the plurality of cores is to execute at a performance state corresponding to a maximum performance state of a plurality of performance states requested by a plurality of threads that are to execute on the core.

10. The system of claim 1, wherein in a first power management mode the core of the plurality of cores is to execute at a performance state most recently requested by a thread that is to execute on the core, and in a second power management mode the core is to execute at a performance state corresponding to a maximum performance state of a plurality of performance states requested by one of a plurality of threads that are to execute on the core.

11. The system of claim 1, wherein the at least one of the plurality of processors is to update the one or more control registers in a secure mode of operation.

12. The system of claim 1, wherein the power controller is to communicatively couple to the plurality of cores by a plurality of interconnections.

13. The system of claim 12, wherein the plurality of interconnections comprises bi-directional interconnections.

14. The system of claim 1, wherein the at least one of the plurality of processors comprises at least one traffic sensor to store at least one traffic measurement.

15. The system of claim 1, wherein the core of the plurality of cores further comprises a retirement unit to retire the instructions.

16. The system of claim 1, wherein the plurality of execution units comprises a single instruction multiple data unit.

17. The system of claim 16, wherein the plurality of execution units further comprises an arithmetic logic unit.

18. The system of claim 1, wherein the second indication comprises a single power domain indicator to indicate whether the first set of cores are to be treated as a single power domain to operate at the common performance state.

\* \* \* \* \*